Jan. 28, 1936.　　　C. W. BONDURANT　　　2,028,893
MEANS AND METHOD FOR CONTROLLING REFRIGERATOR TEMPERATURE
Filed Oct. 4, 1932　　　2 Sheets-Sheet 2
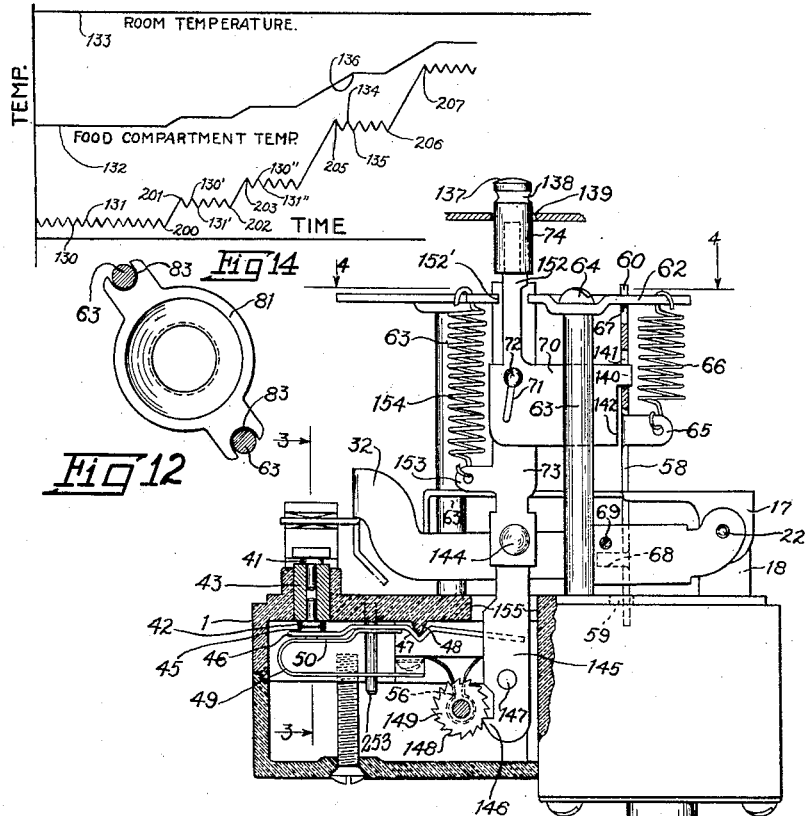
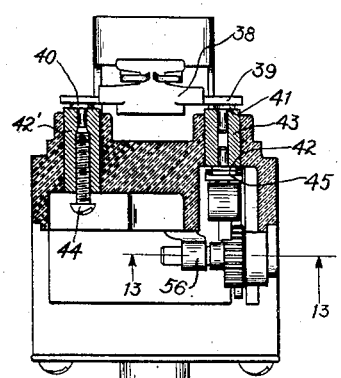
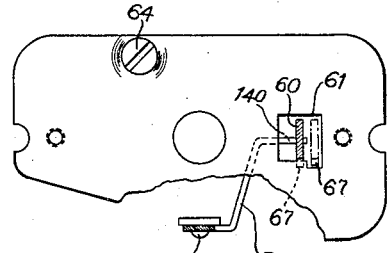
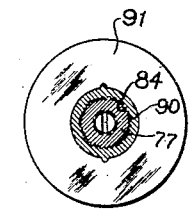
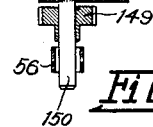
INVENTOR.
Carlton W. Bondurant.
Slough and Canfield
ATTORNEY.

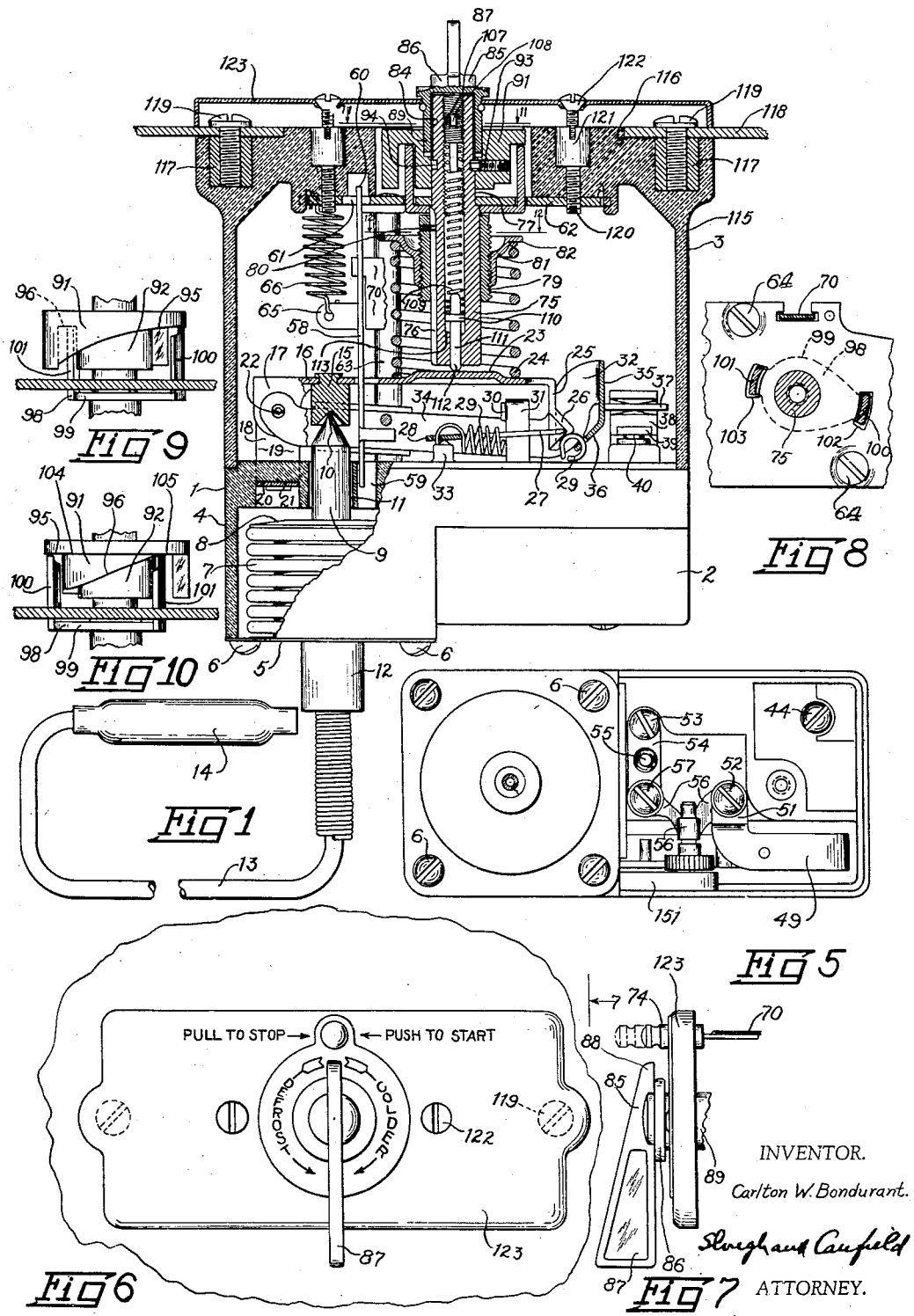

Patented Jan. 28, 1936

2,028,893

UNITED STATES PATENT OFFICE 2,028,893

MEANS AND METHOD FOR CONTROLLING REFRIGERATOR TEMPERATURE

Carlton W. Bondurant, Cleveland, Ohio, assignor to The Bishop & Babcock Manufacturing Company, Cleveland, Ohio, a corporation of Ohio Application October 4, 1932, Serial No. 636,160

15 Claims. (200—81)

This invention relates to means and methods for controlling the temperature produced by power operated refrigerating apparatus and particularly apparatus of the electric power operated class.

Heretofore in the control of electrically operated refrigerating apparatus, such for example as domestic refrigerators, control devices have been employed responsive to changes of temperature of a refrigerator compartment or of a portion of the refrigerating apparatus, to control the starting and stopping of an electric power supplying motor, to maintain the refrigerator compartment at substantially a constant temperature, predeterminedly adjustable by suitable adjustment means on the control device.

The power is automatically turned on and off periodically by the device as the temperature reaches respectively predetermined high and low values. The average value is commonly referred to as the temperature "range" and the temperature difference between the high and low values is commonly referred to as the temperature "differential."

In refrigerating apparatus employing refrigerant circulated through pipes or conduits to absorb heat from the refrigerator compartment, frost usually forms upon the exposed pipes after a period of operation.

Heretofore it has been customary in order to remove the frost, to manually effect a so-called "defrosting" operation by shutting down the power and permitting the refrigerator to warm up to a temperature at which the frost will melt off. Such defrosting operation requires attention and skill to avoid too long continuance thereof and the consequent attainment of a high temperature at which food or the like in the refrigerating compartment will spoil.

It is an object of this invention to provide an improved method and means for controlling refrigerating apparatus whereby defrosting may be effected in an improved manner without danger of attainment of an undesirably high temperature.

Another object is to provide such a method and means whereby, to effect the defrosting operation, the temperature of the refrigerator may be maintained at substantially a predetermined maximum sufficient to effect defrosting but low enough to preserve food or the like in the refrigerator compartment.

Another object is to provide, in an automatic power operated refrigerator of the class in which the power is periodically turned off and on in response to changes of temperature of a control point or station thereof to maintain a predetermined temperature differential and temperature range, improved means to effect a change of temperature range independently of the temperature differential.

Another object is to provide, in an automatic power operated refrigerator of the class referred to, improved means whereby the temperature range may be raised to effect a defrosting operation while concurrently maintaining the refrigerator at a food preserving temperature and at a predetermined temperature differential.

Another object is to provide an improved thermostatic electric switch device for automatically controlling the electric motor of a motor operated refrigerating apparatus.

Another object is to provide an improved thermostatic electric switch device for automatically controlling the electric motor of a motor operated refrigerating apparatus whereby the above objects may be attained.

Another object is to provide an improved thermostatic electric switch device of the class referred to having improved means to adjustably vary the temperature range independently of the temperature differential.

Another object is to provide an improved electric switch control device for refrigerator motors having improved operable means for stopping the motor for an extended period of time and for starting it up again at the end of that time.

Another object is to provide, in an electric control device for refrigerator motors, improved means for stopping the motor automatically in case of a current overload to the motor.

Another object is to provide, in an electric control device for refrigerator motors, an improved thermally actuatable means for stopping the motor in case of a current overload thereto and improved manually operable means for restarting the motor.

Another object is to provide an improved thermostatic electric switch of the class referred to adaptable to economical manufacture and to efficient operation.

Another object is to provide such a thermostatic electric switch which is adapted to present an aesthetic appearance when installed in connection with a commercial, domestic or the like refrigerator.

Another object is to provide, in association with an electric power operated refrigerating apparatus, an improved method and means for effecting the so-called "defrosting" operation.

Another object is to provide, in connection with an electric power operated refrigerating apparatus, improved means for adjustably varying the temperature range.

Another object is to provide, in connection with an electric power operated refrigerating apparatus, improved means for adjustably varying the temperature range independently of the temperature differential.

Another object is to provide a method and apparatus for effecting defrosting or frost prevention in a refrigerating apparatus comprising a compressor while concurrently operating the compressor.

Another object is to provide a method and apparatus for producing a defrosting or frost preventing temperature in a refrigerating apparatus while concurrently operating the compressor and whereby the said temperature may be adjusted in an improved manner.

Other objects will be apparent to those skilled in the art to which my invention appertains.

My invention is further disclosed in the following description taken in connection with the accompanying drawings, in which:

Fig. 1 is an elevational cross-sectional view of the thermostatic switch device embodying my invention;

Fig. 2 is a view similar to Fig. 1 taken from the opposite side of the parts thereof, and with parts shown in cross-section which are shown in elevation in that figure;

Fig. 3 is a view taken approximately from the plane 3—3 of Fig. 2;

Fig. 4 is a fragmentary view taken from the plane 4—4 of Fig. 2;

Fig. 5 is a view taken from the bottom of the parts of Fig. 1 and with a cover thereof removed;

Fig. 6 is a top plan view of the device of Fig. 1;

Fig. 7 is a view taken from the plane 7—7 of Fig. 6;

Fig. 8 is a fragmentary view taken from the plane of the upper face of a plate 62 constituting part of the embodiment of Fig. 1;

Fig. 9 is a fragmentary view illustrating in elevation a cam element shown in cross-section in Fig. 1;

Fig. 10 is a view similar to Fig. 9 taken from the opposite side thereof;

Fig. 11 is a fragmentary sectional view taken from the plane 11 of Fig. 1;

Fig. 12 is a fragmentary sectional view taken from the plane 12—12 of Fig. 1 and with parts thereof omitted for simplicity;

Fig. 13 is a fragmentary view of a thermally releasable latch element which I may employ;

Fig. 14 is a chart illustrating diagrammatically variations of temperature which may result in the operation of or by the adjustment of the apparatus illustrated in the figures and to be described hereinafter.

Referring to the drawings, I have illustrated generally at 1 a base and at 2 and 3 housing or cover portions associated with and secured thereto for housing apparatus mounted upon the base. The parts 1, 2 and 3 may be formed from "Bakelite" or other suitable moldable and preferably insulating material.

The base 1 has a downwardly open cup portion 4 the lower or open end of which is closed by metal plate 5 and secured to the cup by screws 6—6 threaded into suitable thickened portions of the cup wall.

The plate 5 has sealedly secured thereto the lower end of a thermostatic bellows 7 the upper end of which is sealedly closed by a cover or end thrust element 8 to substantially the center of which is rigidly connected an upwardly extending plunger 9 terminating upwardly in a generally conical point 10 and vertically reciprocable with expansive and contractive movements of the bellows 7 and during its reciprocatory motion, being guided in a bore 11 in the base 1 and in the bottom of the cup portion 4.

Communicating with the interior of the bellows 7 through a sleeve 12 on the plate 5 is a flexible tube 13 terminating in a bulb 14, and the bellows 7, tube 13 and bulb 14 constitute a sealedly closed chamber into which a predetermined quantity of thermally expansible fluid may be injected; and by this construction, as will now be understood by those skilled in this art, when the bulb 14 is subjected to changes of temperature, the fluid will correspondingly expand or contract and cause, through the agency of the bellows 7, a corresponding vertical movement of the plunger 9.

The conical point 10 of the plunger 9 is seated in a corresponding recess in the lower end of a socket member 15 riveted or otherwise rigidly connected to a lever 16 formed from sheet metal and having rearwardly, or at its left end as viewed in Fig. 1, a pair of depending ears 17—17 straddling the upwardly extending legs 18—18 of a U-shaped bearing element illustrated generally at 19, rigidly secured to the base 1 by projecting the legs 18—18 upwardly through suitable perforations in the bottom of the cup 4, and securing the closed end of the U, 20, to the cup bottom, for example by a rivet 21.

A transverse shaft 22 is projected horizontally through the legs 18 and the ears 17 to rotatably mount the lever 16 on the shaft 22 as a bearing.

The lever 16 extends forwardly or to the right as viewed in Fig. 1 and the main body portion thereof is provided with an upwardly projected boss 23, circular in configuration to center the lower convolution of a compression spring 24 abutting upon the lever at its lower end.

At its extreme forward end, the lever 16 has a pair of downwardly extending forks 25—25 provided at their lower ends with pockets 26—26 in which pockets are disposed the leg ends 27 of a U-shaped lever 28, the closed end of the U of which has looped therein one end of a tension spring 29.

Upon up and down movements of the forks 25 of the lever 16 corresponding to movements of the plunger 9, the pockets 26 will raise or lower the leg ends 27 and cause the lever to fulcrum over a fulcrum or fulcrums 30 formed upon the upstanding legs 31 of a U-shaped sheet metal element mounted on the base 1 to cause the closed end 28 of the lever 27 to snap from an upper to a lower position or vice versa to change the direction of pull of the spring 29 to correspondingly snap-operate a switch arm 32, to be more fully described.

In its downward position, the closed end of the lever 28 may be stopped upon a post or posts 33.

The switch arm 32 referred to is preferably formed from sheet metal and comprises a pair of rearwardly extending arms 34 which at their rearward or left-hand ends as viewed in Fig. 1 straddle the ears 17 of the lever 16 and are rotatably mounted upon the shaft 22. The forward ends of the arms 34 are closed by an integral portion 35 having an integral downwardly extending tongue 36 and a pair of forwardly extending arms 37. The lower end of the tongue 36 is hooked to the forward end of the spring 29 and thus as the rearward end of the spring 29 is raised and lowered as above described, with a snap-action, the forward end of the switch arm 32 together with the arms 37—37 thereof are moved with a snap movement upwardly or downwardly to switch-operating position to be described.

The foregoing description of parts of the lever 16 and switch arm 32 is brief and a more complete description thereof may be found in an application for patent, Serial No. 636,159, filed October 4, 1932, by me, in which a similar thermostatically operated switch device is disclosed.

Embraced between the arms 37 is a contact head 38, preferably formed from insulating material, and in which is embedded a contact bar 39 adapted to bridge and connect a pair of switch contacts 40 and 41 which are generally of rivet form, the head of the rivet comprising the contact portion and the shank of the rivet being driven into suitable bores of metallic bushings 42' and 43 respectively which are pressed or integrally molded into the insulating material of the base 1 as shown in Fig. 3.

As will now be understood, up and down snap movements of the switch arm 32 will with a snap movement carry the contact bar 39 out of and into engagement with the contacts 40 and 41 to open and close an electric circuit which may control the electric motor of a refrigerator to stop and start the same.

The bushing 42' has screwed thereinto an electric terminal screw 44 to which one line wire of the circuit may be directly connected. The lower end of the bushing 43 has driven thereinto another rivet-formed contact 42. A contact 45 is mounted on the end, see Fig. 2 and Fig. 3, of a switch arm 46 mounted to rock on the base 1, being provided with a transverse groove 47 engaging a transverse projection 48 on the base. As viewed in Figs. 2 and 4, the switch arm 46 is constrained resiliently to move toward the position to engage the contacts 42 and 45 by a spring 49, preferably of U-shape, the free end 50 of which engages the end of the lever 46 carrying the contact 45, and the other end of which terminates in an offset ear 51, see Fig. 5, secured rigidly to the base 1 as by a screw 52. The spring 49 thus maintains the contacts 42—45 normally engaged.

The switch arm 46 and spring 49 are guided in their movements to maintain them in correct alignment and position by a pin 253 projected through suitable elongated perforations in the lever and spring and driven or originally molded rigidly into the base 1.

The spring 49 also functions as a current conductor to carry current from the contacts 42—45 when engaged. The other outgoing lead terminal, corresponding to the terminal 44, is provided by a screw 53 in a terminal plate 54 rigidly secured on the base 1, see Fig. 5, as by a rivet or screw 55; and the circuit from the screw 52 to the plate 54 is completed through a flat metal heating element 56 connected at opposite ends to the screw 52 and to the plate 54 by a screw 57.

As will now be understood, the external circuit, for example to the motor of a refrigerator compressor, and connected to the switch device above described by the screws 44 and 53, may be broken or made at the contacts 40 and 41 automatically by the automatic operation of the switch arm 32 in response to changes of temperature at a control station on the apparatus or in a refrigerator compartment, through the agency of the thermostatic bellows 7.

Means will now be described for effecting control of the circuit manually as desired to either make or break the circuit optionally at the contacts 40 and 41 and also for effecting control of the circuit by automatically breaking it at the contacts 42—45 upon the occasion of a current overload to the motor through the agency of the heating element 56 above referred.

To manually open or close the circuit by means of the contacts 40 and 41, I provide a vertically reciprocable bar 58 the lower end of which is guided in a suitable recess 59 in the base 1 and the upper end of which as at 60 is guided generally in a perforation 61 in a base plate 62 of sheet metal disposed generally parallel to the molded base 1 and rigidly connected thereto and maintained in spaced relation therewith by plurality such as two posts 63—63, the lower ends of which are secured in any suitable manner in the material of the base 1 and to the upper ends of which the plate 62 is secured as by screws 64—64.

The bar 58 is provided with a laterally extending lug 65 and a tension spring 66 is hooked at one end in a perforation in the lug and at the other end in a suitable perforation in the plate 62. The spring thus constantly exerts an upward longitudinal thrust on the bar 58 tending to move it upwardly and also a counter-clockwise torque as viewed in Fig. 2 tending to move the upper end 60 of the bar 58 toward the left, the perforation 61 being relatively large to this end and for a purpose to be described.

The upward movement of the bar 58 under impulsion of the spring 66 is normally prevented by a shoulder 67 on the bar engaging the underside of the plate as particularly shown in Figs. 2 and 4.

The bar 58 is provided also with a laterally extending lug 68 normally disposed under and spaced from a projection 69 provided on the switch arm 32.

Upon movement of the bar 58 toward the right as viewed in Fig. 2, the upper end 60 of the bar will move into a relatively larger portion of the perforation 61 and the shoulder 67 will be free from the lower edge of the plate as clearly shown in Fig. 4 and the bar 58 will be projected upwardly by the spring 66 and the lug 68 will engage the projection 69 and move the switch arm 32 upwardly breaking circuit at the contacts 40 and 41.

The tension of the spring 66 is preferably provided sufficient to prevent switch closing snap action of the switch arm 32 under the impulsion of the relatively light spring 29.

To thus tilt the upper end of the bar 58, as above described, the following means is provided. An element 70, preferably formed from sheet metal, has an inclined slot 71 therein through which is projected a pin 72 carried by a bar 73 (to be described later). The element 70 has an upwardly extending post 152 upon which is formed a cylindrical molded handle 74 terminating at its upper end in a push button portion 137 and a neck 138. The cylindrical portion of the handle 74 is guided for vertical movement in a perforation 139 in a cover plate to be referred to. The element 70 has also a tongue 140 projected through a perforation 141 in the bar 58 and a shoulder 142 disposed adjacent the side of the bar 58.

By this construction, when the handle 74 is pulled upwardly manually by means of the head 137 and neck 138, the element 70 by means of the slot 71 on the pin 72 will have a vertical and concurrent lateral movement toward the right as viewed in Fig. 2, causing the shoulder 142 to push upon the bar 58 and release the shoulder 67 as above described, whereupon the element 70 will be moved upwardly along with the bar 58 by means of the spring 66. This will cause the handle 74 to project farther out of the perforation 139 (see dotted line position in Fig. 7) and serves as an indication that this operation, including opening of the contact by the switch arm 32, has been effected.

Upon depressing the handle 74 by pushing manually upon the button 137, the element 70 will move downwardly, the tongue 140 will engage the lower periphery of the perforation 141, the bar 58 will be moved downwardly until the shoulder 67 is brought below the surface of the plate 62, whereupon the spring 66, acting upon the lug 65, will rock the upper end of the bar 58 to re-engage the shoulder 67 with the plate to hold the bar 58 downward in its normal position.

The operation thus described of opening the contacts 40 and 41 may be effected whenever it is desired to shut down the refrigerating apparatus for an extended period of time or to start it up again at the end of such a period.

For the automatic thermally actuated overload release, the following means is provided. A vertically reciprocable bar 73, preferably formed from sheet metal, has riveted to its lower end as at 144 a piece of insulating material 145 carrying on its lower end a ratchet pawl 146 and adjacent its lower end a lug 147 which may be in the form of a metal rivet.

The pawl 146 is adapted to hook into and engage one or another of the teeth 148 of a ratchet wheel 149 normally supported rigidly and non-rotatively upon the base 1 by being rotatably mounted (see Fig. 13) upon a pin 150 rigidly secured to and projecting from a flange 151 of the base but normally being prevented from rotation by being soldered to the pin 150 in the ratchet wheel bore.

An end portion of the bar 73 opposite the ratchet end is guided in a perforation 152′ in the base plate 62 and is provided with a laterally extending lug 153, and a tension spring 154 is hooked at one end in a perforation in the lug and at the other end in a suitable perforation in the plate 62. The spring 154 thus constantly exerts an upward thrust on the pawl 146 tending to move the bar 154 upwardly. The lower end of the bar 73 may be guided by disposing the lower portion 145 in a suitable perforation 155 in the base 1.

The end of the switch arm 46 opposite the end carrying the contact 45, extends beyond and above the lug 147 on the bar portion 145. When the bar 73—145 therefore is projected upwardly by the spring 154 in a manner to be described, the lug 147 engages the switch arm 46, rocks around the fulcrum 48 and removes the contact 45 from the contact 42 to break the circuit.

Upon the occurrence of an overload of current flowing through the circuit and therefore through the heating element 56, heat is generated in the element and heats the pin 150. The heat is communicated to the solder juncture of the ratchet wheel with the pin and melts the same permitting the ratchet to rotate. The upward pull of the spring 154 therefore pulls on the pawl 146 and rotates the ratchet thus releasing the bar 73 and causing it to break contact at 42—45 in the manner above described.

Upon cessation of current, the heating element cools, the solder hardens, and upon moving the bar 73 downwardly in a manner to be described, it will re-engage the ratchet wheel; and if in the meantime the overload condition has been removed, the ratchet wheel will hold the bar 73 downwardly and maintain the circuit closed.

Upon thermal release of the ratchet wheel 149 as above described, the spring 154, projecting the bar 73 upwardly, causes the pin 72 mounted thereon and engaging the upper end of the slot 71, to move upwardly the element 70 and the handle 74, causing the handle as above described to indicate that the device has thus operated.

The upward movement of the element 70 thus occasioned does not operate to release the bar 58, because the movement of the plate is vertical only.

The bar 73 may, as will be understood, be returned to re-engage the pawl 146 by pushing downwardly manually on the button 137.

The perforation 141 in the bar 58 may be sufficiently long to accommodate the straight vertical movement of the tongue 140 therein when the element 70 is moved upwardly as just described.

From the foregoing description it will be understood that the temperature of the bulb 14 or of the fluid therein and in the bellows 7 necessary to raise the lever 16 to cause it to move up sufficiently to rock the lever 47 around the fulcrum 30 and snap the left end, as viewed in Fig. 1, of the spring 29 downwardly sufficiently to snap the switch arm 32 downwardly to close the contacts as above described and vice versa to open the contacts, will be determined by the pressure on the lever 16 of the spring 24.

Means will now be described to vary the tension of the spring 24 for operative results to vary the temperature range above referred to, and means will also be described to establish adjustably a desired differential as above referred to.

A vertically disposed relatively large diameter shaft 75 longitudinally grooved or splined as at 76 upwardly from the lower end over a portion of its length, has a reduced diameter neck portion 77 projected upwardly through a relatively closely fitting perforation in the plate 62, thus providing a shoulder at the lower end of the neck portion 77, abutting upon the lower side of the plate 62, preventing upward axial movement of the shaft 75.

An externally threaded sleeve 79 slidable axially on the shaft 75 is prevented from rotary movement on the shaft by a pin 80 secured thereto and projecting into the spline 76. If desired, the inner bore of the bushing 79 may be splined correspondingly with the shaft 75.

Upon the threads of the bushing 79 is a threaded nut element 81 having an annular flange 82 upon which the upper end of the spring 24 abuts. The flange 82 has, in its periphery, a pair of diametrically opposite recesses 83—83 embracing the posts 63—63 to prevent rotation of the nut element 81.

By this construction it will be seen that when the shaft 75 is rotated in a manner to be described, the bushing 79 will rotate with it and the nut element 81 will be propelled axially of the bushing to vary the tension of the spring 24.

To rotate the shaft 75, its reduced neck portion 77 on the upper extreme end thereof is splined as at 84, Figs. 1 and 11, and a handle element 85 comprising a head 86, a laterally radially extending handle 87, and indicating finger 88 opposite the handle, has also a depending cup portion 89 provided with axially disposed interior splines 90 adapted to mesh with the splines 84. By this construction, by first removing the handle element 85, it may be first rotated into any angular position relative to the shaft 75 and then telescoped therewith by the splines 84—90 to rigidly connect it with the shaft 75 in any rotated position relative thereto for adjustment purposes. After engagement by means of the splines, the shaft 75 may be turned by the handle 87.

By means of the spline adjustment above referred to, the handle 87 (see Figs. 6 and 7), may be rotatably positioned, until the handle is disposed in a right angle or normal central position at which the tension of the spring 24 is such as to respond to an upper and a lower temperature to correspondingly open and close the switch contacts to maintain a normal or desired temperature "range". If it be desired to decrease the temperature range, the handle 87 may be turned in the direction indicated by the legend "Colder" and the accompanying arrow in Fig. 6. This will have the effect of turning the shaft 75 and releasing tension on the spring 24 by causing the nut element 81 to travel upwardly.

By employing a multiple thread on the bushing 79, I find that a convenient complete range of "Colder" adjustments may be effected by substantially a half revolution of the thread by the handle 87.

By turning the handle 87 in the reverse direction, that is in the direction of the legend "Defrost" and the accompanying arrow, high temperatures will result which may be employed to effect the so-called "defrosting" operation.

I have found in practice that it is desirable to have a wider scale of adjustment for temperatures above the normal running or colder temperatures. By the traveling nut 81 and its associated parts, where one-half revolution of the adjusting handle 87 is employed to regulate the cold and running temperature for ordinary purposes, one one-half revolution is left for the higher adjustment purposes. By the construction now to be described, this remaining half revolution is rendered operative to effect temperature changes more sensitively than for the half revolution thus far described.

At 91 I have illustrated generally a cam, Figs. 1, 9, 10 and 11, comprising a body portion 92 rigidly secured to the neck 77 of the shaft 75 by a set screw 93. Preferably the set screw inner end projects into an annular groove 94 of the neck whereby the rotative position of the cam may be adjusted relative to the shaft.

The cam is provided with two camming surfaces 95 and 96 of general helical configuration and disposed on relatively larger and relatively smaller ideal cylindrical surfaces coaxial with the shaft 75. A cam follower 98 has a body portion 99 perforated to encircle the shaft 75 below the partition 68 and between the partition and the upper end of the bushing 79 and therefore adapted to abut upon the bushing end.

Rising upwardly from the body portion 99 is a pair of upstanding lugs 100 and 101, the upper ends of which engage the said cam surfaces respectively; and the lugs 100 and 101 project through the plate 62 through suitable perforations 102 and 103 therein, Figs. 1 and 8, and the engagement of the lugs with the periphery of the perforations prevents rotation of the cam follower relative to the cam.

Upon rotation of the cam, it will now be clear that the reaction of the cam on the upper ends of the lugs 100 and 101 will move downwardly the cam follower 98 and with it the bushing 79 which will carry downwardly with it the nut element 81 and compress the spring 24. This downward movement of the nut element, being occasioned by the rotation of the shaft 75 to rotate the cam, occurs concurrently with a downward movement of the same nut element 81 by the rotation of the shaft and rotation of the bushing 79. That is to say, the bushing 79 has a rotary movement with the shaft 75 and an axial movement thereon giving a multiplied or very rapid downward movement of the nut element and compression of the spring.

Thus, for a counter-clockwise movement of the handle 87, Fig. 6, the spring is compressed more rapidly for a given rotational movement than upon clockwise rotation from the middle position illustrated in which, as will be understood, the cam is not in operation. To this end, the cam is provided with dwell portions 104 and 105 corresponding to those positions in which the handle 87 is moved clockwise from its central position illustrated.

The shaft 75 is preferably bored out axially, the lower end of the bore being relatively small. The upper end of the bore is threaded and a plug 107 having a screw-driver slot 108 for adjustment is threaded thereinto and engages the upper end of a compression spring 109 disposed in the bore, the lower end of the spring abutting upon a collar 110, on a pin 111, the pin above the collar having a portion extending into the spring to center it and the portion below the collar projecting out of the bore as at 112.

The length of the pin is such that when the lever 16 moves upwardly, it will engage the pin and carry the collar 75 away from the shoulder 113 and compress the spring 109; and that when the lever moves downwardly, it will at or adjacent the lower end of its movement leave the pin end 112 and cause the collar 75 to rest upon the shoulder 113. The tension of the spring 109 may be adjusted by adjustment of the position of the plug 107.

By this construction, the upward movement of the lever 16 in the direction to effect closure of the switch will be initiated at a temperature at which the spring 24 alone will respond. As the lever moves upwardly it picks up the tension of the spring 109 and as it continues to move upwardly it finally reaches the point at which the snap action at the switch occurs and closes the switch. Thus the closure of the switch occurs at a temperature responsive to the pressure of both springs. When the temperature starts down again, it reaches a point at which the two springs jointly may overcome the pressure of the thermostat and the lever 16 starts to move downwardly again toward the switch opening position. As it moves downwardly it leaves the spring 109 and ultimately, in its downward movement, reaches the switch snapping position to open the switch and responsive to the spring 24 alone. Thus the switch closes at a temperature corresponding to both springs and opens at a temperature corresponding only to the spring 24. By adjusting the tension of the spring 109, the difference between the opening and closing temperatures, or temperature "differential", may be adjusted and thereafter changes of tension of the spring 24 alone to effect an adjustment of range temperature may be made substantially without changing the differential.

The cover 3 in the form illustrated comprises a side wall or walls 115 which rests upon the base 1 and a connecting top wall 116 which may have embedded therein in spaced portions thereof, threaded bushings 117 whereby the structure as a whole may be connected to a frame element or elements 118 by screws 119 projected through the frame element into the bushings 117.

To hold the wall portions 115 upon the frame 1, threaded studs 120 having enlarged heads 121 may be projected through the top portion 116 and into threaded perforations in the plate 62. The enlarged head portions 121 may also be threaded and screws 122 threaded thereinto, projected through perforations in a cover plate 123.

The heads of the screws 122 and the cover plate 123 may be ornamented as desired as may also be the head 86 and handle 87. The cover plate may conceal all the other operative parts and render the exposed appearance aesthetic and in harmony with other designed parts of the refrigerator.

Preferably, the end of the handle 74 is given a distinctive color such as red and is disposed so as to project through the perforation 139 of the cover plate 123 at such a point as to be opposite the indicating end or finger 88 of the handle 87 and may provide the indicating point on the scale of adjustment at which the handle 87 may normally be set, and may be of such length that it will suitably project beyond the plate 123 when in the open switch position as indicated in dotted lines in Fig. 7.

The mode of operation of the improved thermostatic control switch above described when employed in connection with a refrigerator, such for example as a domestic refrigerator having a compartment in which food may be stored, is illustrated in Fig. 12.

Ordinates represent temperature and abscissae time. Beginning at the left-hand of the diagram, the temperature points 130 and 131 indicate the low and high temperatures at which the switch successively responds, the difference between these two temperatures being the aforesaid differential. These temperatures may be the temperature to which the bulb 14 is exposed. The temperature of the refrigerator compartment which does not respond as quickly to starting and stopping of the refrigeration compressor, and which may be substantially constant, is illustrated by the substantially constant line of temperature 132. As a line of comparison, the line 133 represents the higher room temperature.

The temperature 132 is therefore the so-called "range" temperature.

The range temperature 132 may be adjusted by moving the handle 87 upon the portion of the adjustment scale indicated by the legend "Colder". By moving the handle equal steps of adjustment, the values 130 and 131 may be changed to 130', 131' or to 130'' and 131'' etc., the average range at these new adjusted positions being respectively higher. In the right-hand portion of the diagram Fig. 14 is illustrated the result of moving the lever 87 counter-clockwise and into the "Defrost" zone of adjustment. As will be seen, for equal steps of adjustment, the average or range changes more rapidly than in the other part of the adjustment zone. Both the upper and lower temperatures as at 134 and 135 have been raised but the difference therebetween, or the so-called temperature "differential", is substantially the same as at 130—131. The range is changed to the higher value indicated at 136. The average value between 130—131 may be raised as high as desired to effect the defrosting operation. Correspondingly, the refrigerator temperature 136 will be raised as indicated in the chart.

As will be observed in the chart, substantially equal relatively small changes are effected by adjustment in the "Colder" part of the scale, as for example going from 200 to 201 or from 202 to 203; and that in the "Defrost" part of the scale, the change of temperature for the same steps of adjustment is greater, as for example going from 204 to 205 or from 206 to 207 etc.

As will now appear, I provide means including the thermostatic switch structure and mode of operation above described, whereby a refrigerating apparatus, including a refrigerator or other compartment means, for preserving food or the like, and including a motor-driven compressor, may be operated to maintain in the refrigerator compartment any desired normal refrigerating temperature range within limits for ordinary operation; and that if frost should form or tend to form upon an exposed refrigerant carrying conduit of the apparatus, it may be melted off, not by shutting down the compressor in the ordinary manner of the prior art, but by adjusting the operating temperature to a point at which frost will melt or not form while maintaining the on and off periodic operation of the compressor, under the control of the differential temperature actuated switch device. Adjustment is provided in the thermostatically operated switch device, whereby whereupon a single revolution of an adjusting handle, an adjustment of temperatures over much greater extent of variation than heretofore possible is provided. Improved means is also provided to shut down and start up again the compressor motor if it should be desired so to control it and improved means to shut down the compressor upon the occurrence of an overload, both such means being operable by a single push-button type of controller handle automatically signaling the circuit condition.

In the temperature chart, Fig. 14, the temperature curves are merely illustrative of the general character of the changes of temperature indicated thereby and are not intended to be accurate as to the actual relative temperatures indicated by the ordinates of the diagram.

My invention is not limited to the exact details of construction shown and described. Many changes and modifications may be made within the scope and spirit of my invention without sacrificing its advantages.

I claim:

1. In a thermally actuatable switch construction, a thermostat comprising an element movable responsive to temperature changes, a switch operable to be opened and closed by movement of the element at predetermined relatively low and high temperatures, and adjustment means adapted to adjustably vary the responsiveness of said switch to effect concurrently both opening and closing operations at higher temperatures or at lower temperatures, the adjustment means comprising an adjustable spring reacting upon a movable element of the switch, and a rotary operable element movable through a range of movement, a threaded element rotatable by the operable element, a second threaded element meshed therewith movable thereby to adjust the spring tension upon rotary movement in one direction, and a cam rotatable by the rotatable element having a cam follower adapted to adjust the spring tension upon rotary movement in the other direction.

2. A thermostatically actuatable switch construction as described in claim 1, and in which the rate of change of the spring tension for rotary movement in one direction is greater than the rate for movement in other direction.

3. A thermally actuatable switch construction as described in claim 1, and in which the rate of change of adjustment when rotation is in the direction to effect adjustment by the cam is greater than in the other direction.

4. A thermally actuatable switch construction as described in claim 1, and in which the adjustment when the operable element is moved in one direction is by the screw threads alone and in the other direction is by the screw threads and the cam concurrently.

5. A thermally actuatable switch construction as described in claim 1, and in which the spring tension is changed by a traveling nut on a rotatable screw rotatable by the operable rotary element when rotated in one direction and by the same traveling nut moving by the concurrent action of the rotating screw threads and also by a cam when the rotatable element is rotated in the other direction.

6. In a switch of the class described, a thermostatically movable switch contact controlling arm, a spring opposing thermostatic movement of the arm in one direction, means for adjusting the tension of the spring comprising a rotatable shaft, a sleeve axially and non-rotatively movable on the shaft, a traveling nut threaded on the sleeve, adapted when it travels to change the tension of the spring, a handle for turning the shaft to effect traveling of the nut in either direction, a cam rotatable with the shaft, having a dwell surface and a camming surface, a cam follower movable axially of the shaft, and engaging the sleeve and adapted to move the cam follower to move the sleeve axially of the shaft to change the tension of the spring, whereby when the shaft is rotated in one direction through a part of a revolution it may change the tension of the spring by the traveling nut independently of the cam and when rotated in the other direction through another part of the revolution may effect traveling of the nut and variation of spring tension concurrently by the screw threads and by the cam follower.

7. In a thermally actuable switch construction, a thermostat, a switch member movable by the thermostat responsive to temperature changes thereof, opposing means opposing thermally effected movement by the thermostat, an element movable to vary the opposition of the opposing means, and adjusting means for adjustably moving the movable element comprising a rotarily and bodily movable element engaged with the movable element to move it relative thereto when rotated and to move it therewith when moved bodily, and means for rotarily and bodily moving the movable element.

8. In a thermally actuable switch construction, a thermostat, a switch member movable by the thermostat responsive to temperature changes thereof, opposing means opposing thermally effected movement by the thermostat, an element movable to vary the opposition of the opposing means, and adjusting means for adjustably moving the movable element comprising a rotatably and axially movable element, engageable with the movable element to move it relative thereto when rotated and to move it therewith when axially moved, and means for rotatably and axially moving the movable element.

9. In a thermally actuable switch construction, a thermostat, a switch member movable by the thermostat responsive to temperature changes thereof, opposing means opposing thermally effected movement by the thermostat, an element movable to vary the opposition of the opposing means, and adjusting means for adjustably moving the movable element comprising a rotary operating element, an intermediate element movable rotarily upon rotary movement of the operating element in one direction and movable bodily upon rotary movement of the operable element in the other direction, and means for transmitting rotary and bodily movement of the intermediate element to the movable element.

10. In a thermally actuable switch construction, a thermostat, a switch member movable by the thermostat responsive to temperature changes thereof, opposing means opposing thermally effected movement by the thermostat, an element movable to vary the opposition of the opposing means, and adjusting means for adjustably moving the movable element comprising a rotary operating element, an intermediate element movable rotarily upon rotary movement of the operating element in one direction and movable axially upon rotary movement of the operating element in the other direction, and means for transmitting rotary and axial movement of the intermediate element to the movable element.

11. In a thermally actuable switch construction, a thermostat, a switch member movable by the thermostat responsive to temperature changes thereof, opposing means opposing thermally effected movement of the thermostat, an element movable to vary the opposition of the opposing means, and adjusting means for adjustably moving the movable element comprising a rotary operating element, an intermediate element movable rotarily upon rotary movement of the operating element in one direction and movable axially and rotarily upon rotary movement of the operating element in the other direction and means for transmitting rotary and axial movement of the intermediate element to the movable element.

12. A thermally actuable switch construction as described in claim 9 and in which the movement of the movable element by the intermediate element is greater for a unit of movement of the operating element in one direction than in the other.

13. In a thermally actuable switch construction, a thermostat, a switch member movable by the thermostat responsive to temperature changes thereof and having a predetermined extent of movement, opposing means opposing thermally effected movement by the thermostat, an element movable to vary the opposition of the opposing means, an adjusting means for adjustably moving the movable element comprising a rotary operating element, an intermediate element movable rotarily upon rotary movement of the operating element in one direction and movable bodily upon rotary movement of the operating element in the other direction, means for transmitting rotary and bodily movement of the intermediate element to the movable element, and a second opposing means effective during a part only of the switch member movement, and means for adjusting the opposition of the second opposing means independently of the adjustment of the first-named opposing means.

14. In a thermally actuable switch construction, a thermostat, a switch member reciprocatorily movable by the thermostat responsive to temperature changes thereof, opposing means opposing thermally effected movement of the thermostat, an element movable to vary the opposition of the opposing means, and adjusting means for adjustably moving the movable element comprising a rotary operating element, an intermediate element movable rotarily upon rotary movement of the operating element in one direction and movable bodily upon rotary movement of the operable element in the other direction, and means for transmitting rotary and bodily movement of the intermediate element to the movable element, and a second opposing means effective during a part only of the switch member reciprocatory movement in one direction, and means for adjusting the opposition of the second opposing means independently of the adjusting means of the first-named opposing means.

15. In a thermally actuable switch construction, a thermostat, a switch member movable by the thermostat responsive to temperature changes thereof and having a predetermined extent of movement, opposing means opposing thermally effected movement by the thermostat, an element movable to vary the opposition of the opposing means, and adjusting means for adjustably moving the movable element comprising a rotary operating element, an intermediate element movable rotarily upon rotary movement of the operating element in one direction and movable bodily upon rotary movement of the operating element in the other direction, means for transmitting rotary and bodily movement of the intermediate element to the movable element, and the rotary operating element effecting greater movement of the movable element for a unit of movement of the operating element in one direction than for a unit of movement thereof in the other direction, and a second opposing means effective during a part only of the switch member movement and means for adjusting the opposition of the second opposing means independently of the adjusting means of the first-named opposing means.

CARLTON W. BONDURANT.